United States Patent
Schmidt et al.

(10) Patent No.: US 9,856,975 B2
(45) Date of Patent: Jan. 2, 2018

(54) HYDRAULIC SYSTEM FOR ACTUATING AN INTERLOCKING SWITCHING ELEMENT OF A GEARING DEVICE

(75) Inventors: Thilo Schmidt, Meckenbeuren (DE); Manuel Straub, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1014 days.

(21) Appl. No.: 13/580,386

(22) PCT Filed: Feb. 16, 2011

(86) PCT No.: PCT/EP2011/052277
§ 371 (c)(1),
(2), (4) Date: Aug. 22, 2012

(87) PCT Pub. No.: WO2011/110409
PCT Pub. Date: Sep. 15, 2011

(65) Prior Publication Data
US 2012/0325038 A1    Dec. 27, 2012

(30) Foreign Application Priority Data
Mar. 11, 2010  (DE) ........................ 10 2010 002 747

(51) Int. Cl.
*F16H 61/02*  (2006.01)
*F16H 61/12*  (2010.01)
(Continued)

(52) U.S. Cl.
CPC ......... *F16H 61/12* (2013.01); *F16H 61/0206* (2013.01); *F16H 61/2807* (2013.01);
(Continued)

(58) Field of Classification Search
CPC .................. F15B 20/002; F15B 20/004; F15B 2211/8623; F15B 2211/8633; F16D 48/0206
(Continued)

(56) References Cited

U.S. PATENT DOCUMENTS 5,413,308 A * 5/1995 Hayes ............................ 251/77
5,893,292 A   4/1999 Lanting
(Continued)

FOREIGN PATENT DOCUMENTS

DE  195 46 631 A1   6/1997
DE  198 16 069 A1  10/1999
(Continued)

OTHER PUBLICATIONS

German Search Report Corresponding to DE 10 2010 002 747.2.
International Search Report Corresponding to PCT/EP2011/052277.
Written Opinion Corresponding to PCT/EP2011/052277.

*Primary Examiner* — Michael Leslie
*Assistant Examiner* — Richard Drake
(74) *Attorney, Agent, or Firm* — Davis & Bujold, PLLC; Michael J. Bujold

(57) ABSTRACT

A hydraulic system for actuating an interlocking shifting element of a transmission which comprises two piston chambers and a piston element that delimits the piston chambers. The piston element can be acted upon in one piston chamber by a pressure to open the shifting element and, in the other piston chamber, by another pressure to close the shifting element. Pressure can be delivered by a valve to two piston chamber and the valve can be actuated by an actuator by a pilot pressure. The valve and the electro-hydraulic actuator are designed and functionally connected to one another such that, in the event of a pressure drop, a total hydraulic force, acting to close the shifting element, is (Continued)

applied to the piston element and, if the current supply to the actuator fails, a total hydraulic force acting, in the opening direction of the shifting element, acts upon the piston element.

9 Claims, 4 Drawing Sheets

(51) Int. Cl.
    *F16H 61/28*     (2006.01)
    *F16H 61/30*     (2006.01)
    *F16H 61/4008*     (2010.01)
    *F16H 61/4069*     (2010.01)

(52) U.S. Cl.
    CPC ......... *F16H 61/30* (2013.01); *F16H 61/4008* (2013.01); *F16H 61/4069* (2013.01); *B60Y 2400/421* (2013.01); *F16H 2061/1232* (2013.01); *F16H 2200/2094* (2013.01); *Y10T 74/20024* (2015.01)

(58) Field of Classification Search
    USPC ............ 60/406; 91/461, 463, 466; 192/3.58; 477/158
    See application file for complete search history.

(56) References Cited

U.S. PATENT DOCUMENTS

| | | | |
|---|---|---|---|
| 6,029,531 A | 2/2000 | Riedhammer | |
| 6,340,290 B1* | 1/2002 | Schott et al. | 416/157 R |
| 7,127,961 B2* | 10/2006 | Braford | F16H 61/0009 74/340 |
| 7,347,117 B2 | 3/2008 | Nassif | |
| 7,487,973 B1* | 2/2009 | Kesselgruber et al. | 280/5.506 |
| 7,736,270 B2 | 6/2010 | Gierer et al. | |
| 8,147,380 B2* | 4/2012 | Fritzer | F16H 61/2807 477/158 |
| 2006/0054442 A1* | 3/2006 | Hegerath et al. | 192/48.9 |
| 2007/0105681 A1* | 5/2007 | Bucher | F16H 61/0246 475/116 |
| 2007/0220879 A1* | 9/2007 | Lochocki | F16D 48/02 60/459 |
| 2008/0234100 A1* | 9/2008 | Gierer et al. | 477/80 |
| 2009/0249777 A1 | 10/2009 | Popp et al. | |
| 2009/0250310 A1 | 10/2009 | Popp et al. | |

FOREIGN PATENT DOCUMENTS

| | | | |
|---|---|---|---|
| DE | 10 2004 020 569 A1 | 12/2005 | |
| DE | 10 2006 014 759 A1 | 10/2007 | |
| DE | 10 2008 001 039 A1 | 10/2009 | |
| DE | 10 2008 001 040 A1 | 10/2009 | |
| EP | 1 621 777 A2 | 2/2006 | |
| WO | WO 2008049735 A1 * | 5/2008 | ......... F16H 61/2807 |

* cited by examiner

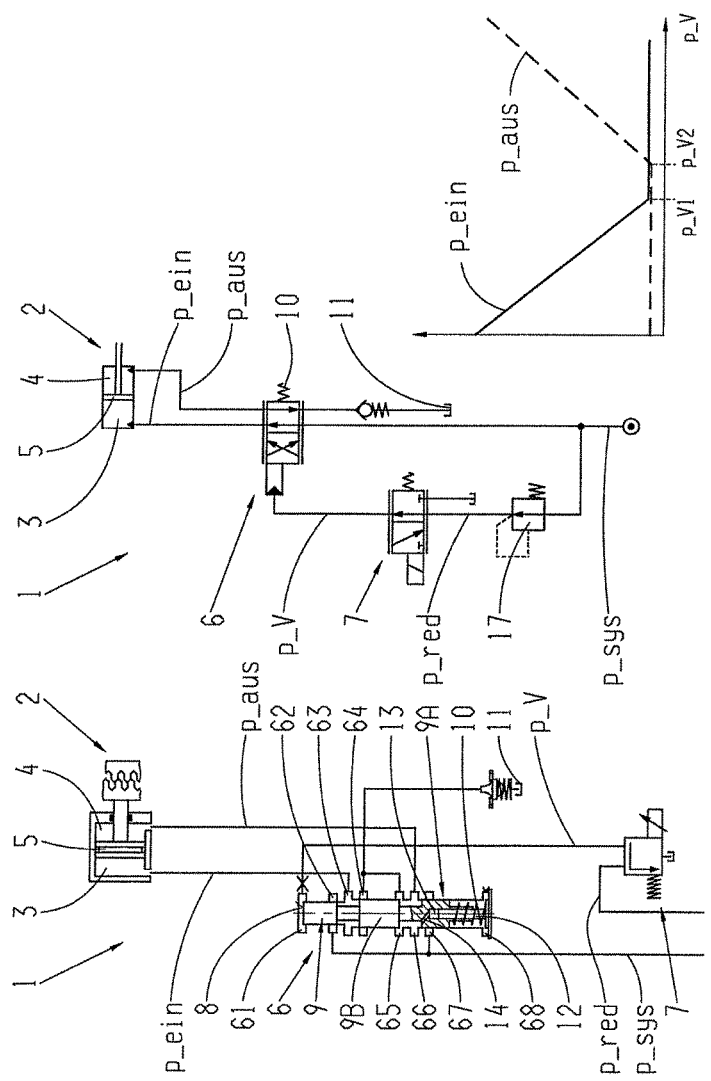

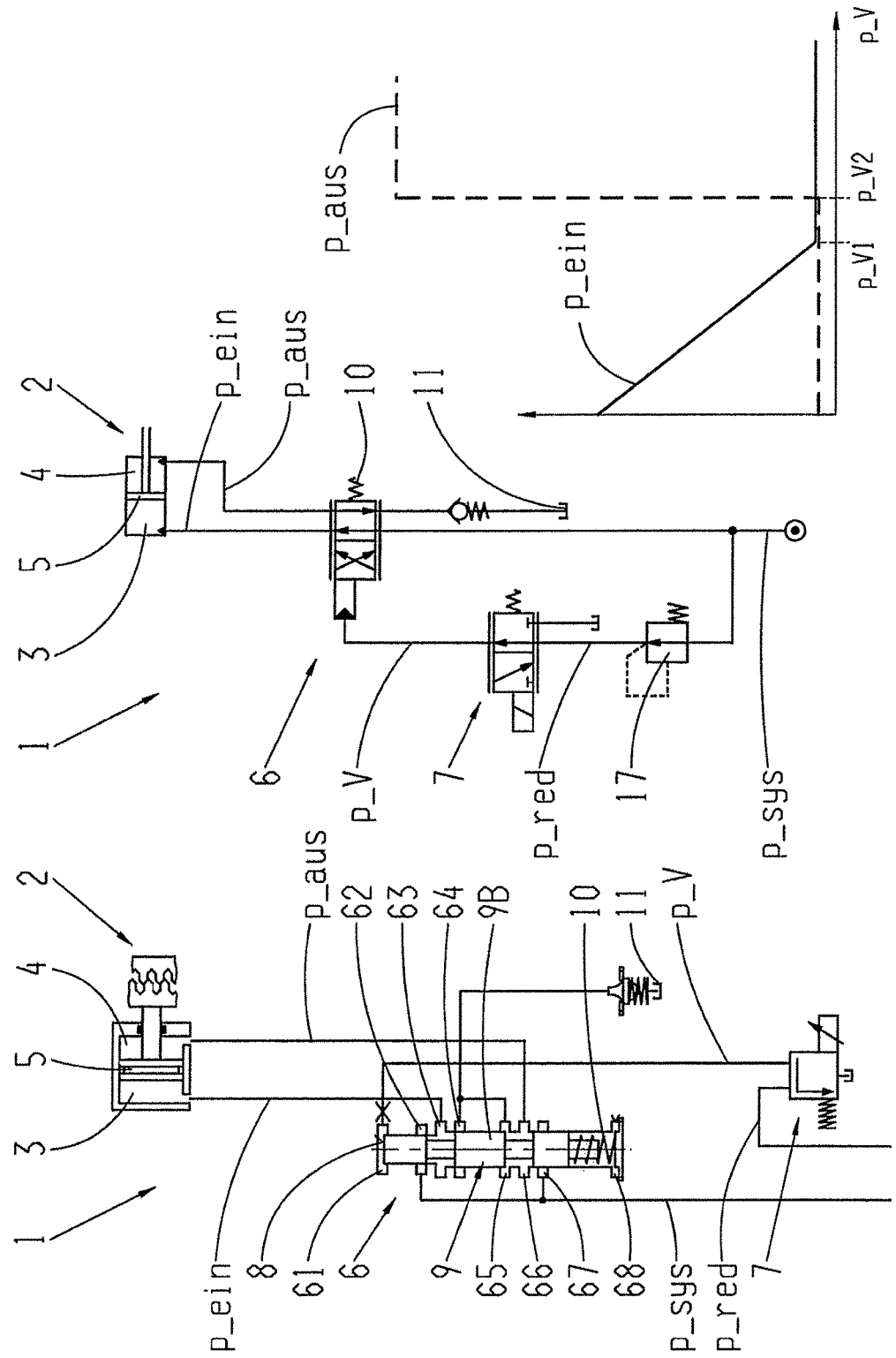

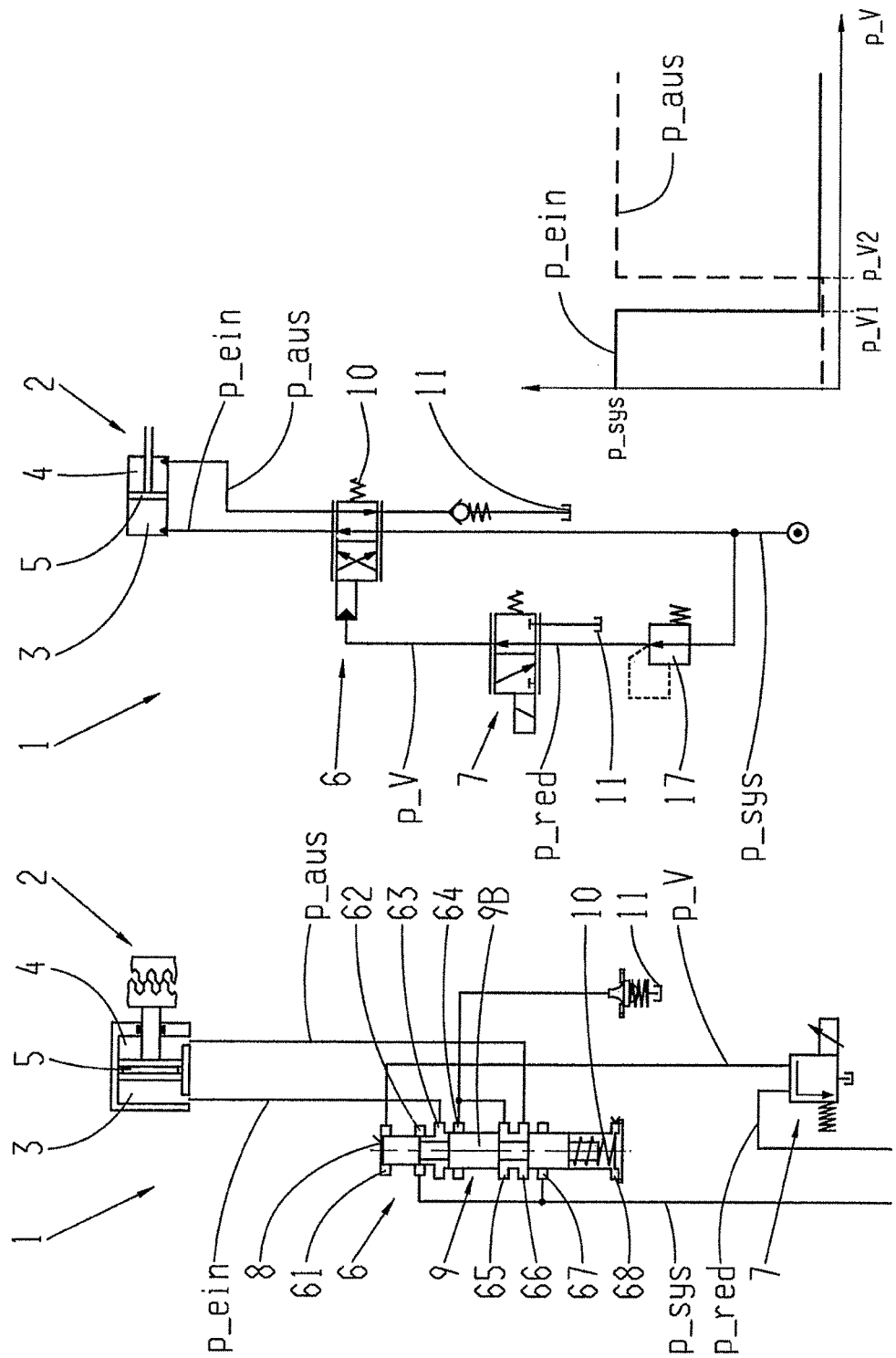

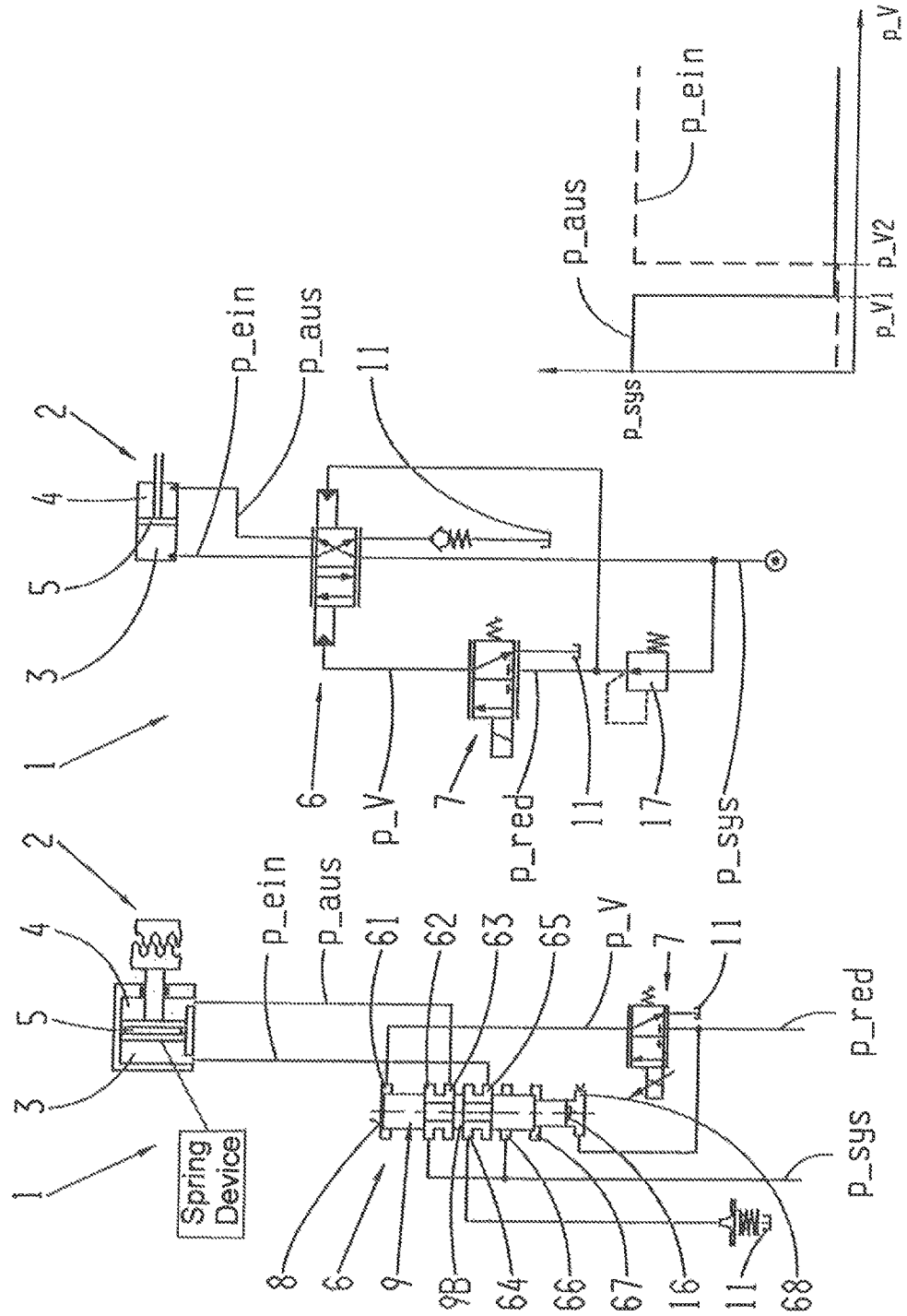

HYDRAULIC SYSTEM FOR ACTUATING AN INTERLOCKING SWITCHING ELEMENT OF A GEARING DEVICE

This application is a National Stage completion of PCT/EP2011/052277 filed Feb. 16, 2011, which claims priority from German patent application serial no. 10 2010 002 747.2 filed Mar. 11, 2010.

FIELD OF THE INVENTION

The invention concerns a hydraulic system for actuating an interlocking shifting element of a transmission.

BACKGROUND OF THE INVENTION

Transmission systems known from practice and designed as automatic transmissions are designed to obtain various gear ratios by means of shifting elements which can in each case transmit an applied torque by friction. When there is a command to obtain a defined gear ratio, in each case at least one or more of the frictional shifting elements are disengaged from the force flow of a transmission while at least one or more other frictional shifting elements are engaged in the force flow of the transmission to obtain the gear ratio required. During the process of engaging a frictional shifting element, no special synchronization measures are needed to ensure a desired shifting comfort since the shifting comfort desired can be achieved with frictional shifting elements at defined contact pressures within a broad range of rotational speed differences.

Since, in a manner known per se, such transmission systems can only be operated with insufficient efficiencies because of drag losses that occur in the area of open frictional shifting elements, certain frictional shifting elements are replaced by interlocking shifting elements. In such automatic transmissions, made with both frictional shifting elements and with at least one interlocking shifting element and designed with a corresponding gearset structure, to carry out a defined shift command at least one interlocking shifting element has to be engaged in a force flow of the transmission.

Compared with frictional shifting elements, interlocking shifting elements with or without additionally designed synchronizing devices can only be engaged comfortably when the speed differences are very small, i.e. close to the synchronous speed, and for that reason the operation of a transmission made with at least one interlocking shifting element and designed as an automatic transmission is made more difficult to an undesired extent, at least while carrying out certain shifts that involve an interlocking shifting element.

Moreover, if shifts are to be carried out without traction force interruption, then for example in planetary transmissions interlocking shifting elements or claw-type shifting elements can only be used if they are disengaged during upshifts from a lower gear to a higher gear. In turn, a result of this is that interlocking or claw shifting elements are essentially engaged in a force flow of a transmission to obtain low gears, during which a drive machine of a vehicle is temporarily stopped depending on the operating condition if the motor start-stop function is activated.

Interlocking shifting elements are engaged by means of electric actuators preferably designed as pilot valves. Among these a distinction is made between pilot valves in which the pilot pressure, as a function of which the actuating pressure of the interlocking shifting element is determined, increases as the control current decreases, and those in which the pilot pressure decreases as the control current increases.

If an interlocking shifting element is actively engaged by means of a pilot valve in which the pilot pressure is proportional to the control current, then when the pilot pressure is reduced the interlocking shifting element is disengaged if the actuating pressure is likewise proportional to the pilot pressure. By controlling the interlocking shifting element by means of a proportional pilot pressure valve, to ensure a desired safety standard in the event of a failure of the electrical control system, the interlocking shifting element should be moved to a safe condition, preferably its open operating condition.

Since hydraulically actuated shifting elements are usually supplied with hydraulic pressure by means of a hydraulic pump driven by a drive machine, when the drive machine stops preferably by virtue of a motor start-stop system the hydraulic supply pressure in the hydraulic system of a transmission falls. The claw shifting elements engaged in low gears, which for example are designed with a simply acting piston-cylinder system and with a spring device that acts in the opening direction of the interlocking shifting element, are changed by the restoring spring to an open operating condition when the pressure supply is cut off.

However, interlocking shifting elements of such a design have the disadvantage that during driving operation the restoring spring has to be constantly counteracted if the interlocking shifting element is to be kept in its closed operating condition. Here, it is particularly problematic that a high restoring force has to be provided by the restoring spring, since it must be possible to disengage the interlocking shifting element dynamically and quickly in opposition to internal friction forces and a hydraulic resistance of the hydraulic system.

To avoid spontaneous disengagement of an interlocking shifting element, owing to the high restoring force in the area of the restoring spring, a high actuating pressure acting in the closing direction of the interlocking shifting element must be provided.

On the other hand, a lasting engagement of a claw shifting element by means of an engaging spring that acts in the closing direction of the claw shifting element should be avoided for safety reasons, since if the disengagement pressure of the claw shifting element is not controlled correctly the interlocking shifting element would be automatically engaged.

SUMMARY OF THE INVENTION

Accordingly, the purpose of the present invention is to provide a hydraulic system for actuating an interlocking shifting element of a transmission by virtue of which, if there is a pressure drop in the hydraulic system, an interlocking shifting element is not automatically disengaged, and if the current supply to an electric actor which sets the actuating pressure fails so that the system switches over to hydraulic emergency operation, the interlocking shifting element is reliably opened.

In the hydraulic system according to the invention for actuating an interlocking shifting element of a transmission, the shifting element having two piston chambers and at least one double-action piston element that delimits the piston chambers, which can be acted upon in the area of one of the piston chambers by an actuating pressure that acts in the opening direction of the shifting element and in the area of the other piston chamber by an actuating pressure that acts in the closing direction of the shifting element, the actuating pressure can be delivered to one or the other piston chamber by a valve device and the valve device can be actuated by a pilot pressure by means of an electro-hydraulic actuator.

According to the invention the valve device and the electric actuator are designed and functionally connected to one another in such manner that in the event of a pressure drop a hydraulic total force component acting in the closing direction of the shifting element is applied to the piston element, whereas if the current supply to the actuator fails a hydraulic total force component acting in the opening direction of the shifting element is applied to the piston element.

The control of the interlocking shifting element by way of the electro-hydraulic actuator and a corresponding connection of the valve device actuated by the electro-hydraulic actuator to the interlocking shifting element ensures that if the system changes to hydraulic emergency operation or if the current supply to the electro-hydraulic actuator fails, the interlocking shifting element will be reliably opened and at the same time, if the actuating pressure is reduced, the interlocking shifting element is held in its closed operating condition when the electro-hydraulic actuator is energized.

Both the characteristics indicated in the claims and those indicated in the example embodiments of the hydraulic system according to the invention described below are in each case suitable, whether in isolation or in any desired combination with one another, as further developments of the object according to the invention. In relation to the further development of the object according to the invention the respective combinations of characteristics do not have any restrictive force but are essentially described only as examples.

BRIEF DESCRIPTION OF THE DRAWINGS

Further advantages and advantageous embodiments of the hydraulic system according to the invention emerge from the claims and from the example embodiments whose principle is described with reference to the drawings; in the description of the various example embodiments, for the sake of clarity the same indexes are used for components having the same structure and function.

The drawings show:

FIG. 1a: A simplified layout diagram of part of a first embodiment of the hydraulic system according to the invention;

FIG. 1b: A more detailed representation of a shifting scheme of the hydraulic system in FIG. 1a;

FIG. 1c: Variations of hydraulic pressures in the piston chambers of an interlocking shifting element that can be actuated by means of the hydraulic system of FIG. 1a, by a pilot pressure that can be set in the area of an electro-hydraulic actuator;

FIG. 2a: A representation similar to FIG. 1a, of a second embodiment of the hydraulic system according to the invention;

FIG. 2b: A representation similar to FIG. 1b, of the second embodiment of the hydraulic system;

FIG. 2c: A representation similar to FIG. 1c, showing pressure variations in the piston chambers of an interlocking shifting element that can be controlled by the hydraulic system of FIG. 2a;

FIG. 3a: A representation similar to FIG. 1a, of a third example embodiment of the hydraulic system;

FIG. 3b: A representation similar to FIG. 1b, of the third example embodiment of the hydraulic system;

FIG. 3c: A representation similar to FIG. 1c, showing variations of pressures that can be produced in the area of the piston chambers of an interlocking shifting element by the hydraulic system of FIG. 3a;

FIG. 4a: A representation similar to FIG. 1a, of a fourth example embodiment of the hydraulic system according to the invention;

FIG. 4b: A representation similar to FIG. 1b, of the fourth embodiment of the hydraulic system; and FIG. 4c: A representation similar to FIG. 1c, showing variations of actuating pressures that can be applied by the hydraulic system of FIG. 4a in the area of piston chambers of an interlocking shifting element.

DETAILED DESCRIPTION OF THE PREFERRED EMBODIMENTS

FIG. 1a shows a simplified layout diagram of part of a hydraulic system 1 for actuating an interlocking shifting element 2 of a transmission (not shown in any more detail in the drawing). The interlocking shifting element 2 is formed with two piston chambers 3, 4 and a double-action piston element 5 that delimits the piston chambers. The piston element 5 can be acted upon in the area of the piston chamber 4 with an actuator pressure p_aus that acts in the opening direction of the shifting element 2, and in the area of the other piston chamber 3 with an actuating pressure p_ein that acts in the closing direction of the shifting element 2.

The actuating pressure can be delivered by way of a valve device 6, in this case made as a 4/2-way valve, to one piston chamber 3 or to the other piston chamber 4. For this purpose the valve device 6 can be actuated by means of an electro-hydraulic actuator 7, in this case made as a pressure control valve, by a pilot pressure p_V in the manner described in more detail below.

In the manner shown in more detail in FIG. 1b, the pilot pressure p_V in the area of the electro-hydraulic actuator 7 is applied on a functional surface 8 of a valve slide 9 of the valve device 6. At the same time the valve slide 9 is acted upon by a spring device 10 which opposes the pilot pressure p_V, so that at low pilot pressure values the valve slide 9 is held by the spring device 10 in a first, displaced end position. The pilot pressure p_V depends on a reduction pressure p_red applied at the electro-hydraulic actuator 7, which is set in the hydraulic system 1 in the area of a pressure-reducing valve 17 in a manner known as such. As the energizing current of the electro-hydraulic actuator 7 increases the pilot pressure p_V increases with it and moves the valve slide 9, against the spring force of the spring device 10, from its first end position progressively toward its second end position.

In the present case the valve device 6 is made with eight control edges 61 to 68, such that at the second control edge 62 and the seventh control edge 67 respectively a system pressure p_sys is applied, which depending on the position of the valve slide 9, is passed on in a correspondingly modified form to the first piston chamber 3 or to the second piston chamber 4 for actuating the interlocking shifting element 2.

In the area of the piston chambers 3 and 4, as a function of the pilot pressure p_V the pressure variations of the actuating pressure p_ein produced in the piston chamber 3 and of the actuating pressure p_aus produced in the piston chamber 4 are shown in detail in FIG. 1c. During the actuation of the interlocking shifting element 2 by the double-action piston element 5, by alternate pressurization of the two piston chambers 3 and 4 in the two actuation directions of the interlocking shifting element 2 in each case a high displacement speed is achieved. The two piston chambers 3 and 4 are controlled by the common valve device 6 or its so-termed square-edged slide, which supplies the piston chamber 3 of the interlocking shifting element 2 with actuating pressure in one of its end positions and the piston chamber 4 in its other end position.

The valve device 6 is designed with a large displacement path in order to avoid actuating the two piston chambers 3 and 4 simultaneously. In addition the valve device has a neutral position in which the two piston chambers 3 and 4 are acted upon by a tank pressure or by a pre-filling pressure from an essentially unpressurized part 11 of the hydraulic system 1. Ideally the neutral position of the valve slide 9 of the valve device 6 is reached when the pilot pressure p_V is essentially between its extreme values. In the present case the neutral position of the valve device 6 extends between the pilot pressure values p_V1 and p_V2.

At a pilot pressure p_V equal to zero the valve slide 9 is in its first end position and the second control edge 62 is fully open, so that the system pressure p_sys is delivered essentially unchanged to the first piston chamber 3 as the actuating pressure p_ein. In this operating condition of the valve device 6 or of the hydraulic system 1 the interlocking shifting element 2 is engaged.

As the pilot pressure value p_V increases the valve slide 9 is progressively displaced in opposition to the spring device 10 and the actuating pressure p_ein in the first piston chamber 3 decreases steadily until the pilot pressure value p_V1 is reached and the second control edge 62 is completely closed off by the valve slide 9. The fourth control edge 64 is then connected to the essentially unpressurized area 11. As the pilot pressure p_V increases still more and the valve slide 9 is displaced farther, the seventh control edge 67 is connected to the sixth control edge 66 and the system pressure p_sys is delivered in correspondingly modified form toward the second piston chamber 4.

In the area of the spring device 10 the valve slide 9 is formed essentially as a hollow cylinder and, with a further piston 12 engaged in the hollow cylindrical area 9A, delimits a pressure chamber 13 which is connected by way of a bore 14 in the valve slide 9 to a valve space 15 delimited by the hollow cylindrical area 9A and by a further valve slide section 9B. By virtue of this design of the valve device 6, at pilot pressure values higher than the second pilot pressure value p_V2 a resultant total force component is applied to the valve slide 9, which in turn results from the variation of the actuating pressure p_aus in the second piston chamber 4, represented in FIG. 1c.

With the first example embodiment of the hydraulic system 1 illustrated in FIGS. 1a and 1b it is ensured, for example when the pressure supply is interrupted by virtue of an activated motor start-stop function, that the closed interlocking shifting element 2 is not disengaged while the electro-hydraulic actuator 7 is energized. At the same time, in the event of a transition to the hydraulic emergency operation of the hydraulic system 1, during which the current supply to the electro-hydraulic actuator is cut off while pressure is still supplied to the hydraulic system 1, it is ensured that the interlocking shifting element 2 is acted upon in the area of the second piston chamber 4 by the full hydraulic actuating pressure p_aus and thereby changed to its open operating condition.

If the electro-hydraulic actuator designed as a pressure control valve is energized with its maximum control current, the pilot pressure p_V has its minimum value. The result is that owing to the minimum pilot pressure p_V, the interlocking shifting element is also not engaged when the pressure supply p_sys is cut off.

FIGS. 2a and 2b show a second example embodiment of the hydraulic system 1, which differs from the first example embodiment of the hydraulic system 1 essentially only in the area of the valve device 6, for which reason the description below deals only with the differences between the two embodiments whereas for the other functions of the hydraulic system 1 according to FIGS. 2a and 2b reference should be made to the description relating to FIGS. 1a to 1c.

The valve slide 9 of the valve device 6 of the hydraulic system shown in FIGS. 2a and 2b is made without the hollow cylindrical area 9A of the valve slide 9 of the valve device 6 shown in FIG. 1b, so that the actuating pressure p_aus of the second piston chamber 4 jumps to its maximum pressure level as soon it reaches the second pilot pressure value p_V2. This results from the fact that the reaction surface of the hollow cylindrical area 9A of the valve device 6 in FIG. 1b that can be acted upon by the actuating pressure p_aus, is absent in the version of the hydraulic system 1 shown in FIG. 2b.

In the further example embodiments of the hydraulic system shown in FIGS. 3a and 3b and in FIGS. 4a and 4b respectively, compared with the second embodiment of the hydraulic system in FIG. 2a and according to FIG. 2b the electro-hydraulic actuator 7 is in the form of a magnetic valve. In the first switch position of the magnetic valve the pilot pressure p_V is equal to zero, while in the second switch position of the magnetic valve the value of the pilot pressure is maximum.

In these third and fourth embodiments of the hydraulic system 1 shown in FIGS. 3a and 3b or FIGS. 4a and 4b respectively, the pressure threshold of the actuating pressure above which the interlocking shifting element 2 is automatically engaged is below a pressure value of the system pressure p_sys at which the frictional shifting elements of a transmission no longer transmit any torque. In transmission devices known as such, this pressure value is preferably a pressure of around 1 bar.

In the fourth embodiment of the hydraulic system 1 shown in FIGS. 4a and 4b a hydraulic pressure, in this case the reducing pressure p_red, is applied on a further functional surface 16 of the valve slide 9 of the valve device 6, this pressure acting in opposition to the pilot pressure p_V. The further functional surface 16 is smaller than the functional surface 8 of the valve slide 9 that can be acted upon by the pilot pressure p_V. This ensures that when the electro-hydraulic actuator 7, in this case in the form of a magnetic valve, is switched on, a total force component acts on the valve slide 9 which moves the valve slide 9 to its second end position so that the piston chamber 3 is pressurized with the actuating pressure p_ein and the interlocking shifting element 2 is changed to its closed operating condition or held in its closed operating condition.

In the deactivated or switched-off operating condition of the electro-hydraulic actuator 7 the pilot pressure is at least approximately, or actually, equal to zero, so that the reducing pressure p_red acting in the area of the further functional surface 16 moves the valve slide 9 back to its first end position, the second piston chamber 4 is pressurized with the actuating pressure p_aus, and the interlocking shifting element 2 is changed to its open operating condition.

In the event of an electric power failure and the consequent transition of the hydraulic system 1 to hydraulic emergency operation, the electro-hydraulic actuator 7 or magnetic valve changes to its first switch position and the pilot pressure p_V falls to zero. The valve slide 9 is then moved back by the reducing pressure p_red acting on the further functional surface 16 to its first end position, and the interlocking shifting element is disengaged.

During an interruption of the pressure supply actively brought about by an activated motor stop-start system, both the pilot pressure p_V in the area of the electro-hydraulic actuator 7 or magnetic valve and also the reducing pressure p_red fall to an equal extent, so that depending on the existing operating condition of the electro-hydraulic actuator 7 the valve slide 9 remains in its first end position or in its second end position. Accordingly, depending on the application concerned, if the pressure supply is interrupted actively by a motor start-stop system, the interlocking shifting element 2 is engaged or disengaged.

In a further embodiment of the hydraulic system not illustrated in the drawing, associated with the valve slide of the valve device there is a further spring device which is provided on the engaging or disengaging pressure side of the valve slide and which produces a defined condition of the interlocking shifting element when the hydraulic system is initialized.

In order to maintain the position of the valve slide in a defined condition even when the vehicle is at rest, for example while on sloping ground, in a further embodiment the interlocking shifting element is provided with a spring device or engaging spring (diagrammatically shown in FIG. 4*b*) that acts upon the double-action piston element in the closing direction of the interlocking shifting element. This ensures that the interlocking shifting element will not inadvertently be changed by virtue of external influences to its open operating condition. In this case, however, care must be taken that the spring force does not exceed a predefined value in order, in a simple manner, to avoid undesired engagement of the interlocking shifting element, for example during undesired pressure drops in the area of the pressure supply.

By using a valve device designed as a square-section slide or 4/2-way valve in combination with an electro-hydraulic actuator which provides a maximum pilot pressure in its de-energized condition, a high engaging force or a controllable engagement speed can be produced in the area of an interlocking shifting element, such that if the electro-hydraulic actuator is in the form of a pressure control valve a continuous characteristic curve can be produced in the area of the actuating pressure of the interlocking shifting element, in both the engagement and the disengagement directions.

Furthermore, a high disengaging force can be provided in the area of the interlocking shifting element, so as to ensure reliable disengagement of the interlocking shifting element in the event of a control failure. Moreover, automatic engagement of the interlocking shifting element when the internal combustion engine is stopped can be achieved in a simply designed manner, in order to enable the vehicle to be started as quickly as possible.

When the engine is stopped the interlocking shifting element remains engaged, whereby a quicker engine and vehicle start can be ensured for example during activated motor start-stop operation. Undesired disengagement of the interlocking shifting element as a result of pressure drops in the area of the system pressure can also be avoided with little effort and expense.

INDEXES

1 Hydraulic system
2 Interlocking shifting element
3, 4 Piston chamber
5 Piston element
6 Valve device
7 Electro-hydraulic actuator
8 Functional surface
9 Valve slide
9A Hollow-cylindrical section of the valve slide
9B Further valve slide section
10 Spring device
11 Unpressurized area
12 Pressure space
14 Bore
15 Valve space
16 Further functional surface
17 Pressure-reducing valve
61 to 68 Control edges
p_aus, p_ein Actuating pressure
p_red Reducing pressure
p_sys System pressure
p_V Pilot pressure
p_V1, p_V2 Pilot pressure values

The invention claimed is:

1. A hydraulic system (1) for actuating an interlocking shifting element (2) of a transmission, the hydraulic system comprising:
a hydraulic actuator having first and second piston chambers (3, 4) and at least one double-action piston element (5) that is connected to the shifting element and delimits the first and the second piston chambers (3, 4), the second piston chamber (4) is acted upon by a first actuating pressure (p_aus) acting in an opening direction of the shifting element (2) and the first piston chamber (3) is acted upon by a second actuating pressure (p_ein) acting in a closing direction of the shifting element (2) such that either the first or the second actuating pressure (p_ein or p_aus) is deliverable by a valve device (6) to a respective one of either the first and the second piston chambers (3 or 4), and the hydraulic system having only one electro-hydraulic actuator (7) and the electro-hydraulic actuator actuates the valve device with a pilot pressure (p_V), the valve device is actuatable to a neutral position in which the first and the second piston chambers are simultaneously acted upon by a substantially unpressurized area of the hydraulic system;
the valve device (6) and the electro-hydraulic actuator (7) being designed and functionally connected with one another in such manner that,
when in an initially closed position of the interlocking shifting element, if a system pressure of the hydraulic system drops, a force component, acting in the closing direction of the shifting element (2), is applied to the piston element (5) to maintain the interlocking shifting element in the closed position;
when in the initially closed position of the interlocking shifting element, if a current supply to the electro-hydraulic actuator (7) fails, a force component acting in the opening direction of the shifting element (2), is applied to the piston element (5) such that the interlocking shifting element shifts from the closed position to an open position;
the pilot pressure (p_V) produced in an area of the electro-hydraulic actuator (7) is applied to a first functional surface (8) of a valve slide (9) of the valve device (6), and when the current is supplied to the electro-hydraulic actuator, the pilot pressure increases and the system pressure is directed to the first piston chamber to bias the piston in the closing direction;

a reducing pressure, acting in opposition to the pilot pressure (p_V), acts upon the valve slide (9), a system pressure supply supplies the system pressure directly to the valve device which modifies the system pressure based on a value of the pilot pressure and passes the modified system pressure, as the first and the second actuating pressures, directly to the second and the first piston chambers, respectively; and in an area of the electro-hydraulic actuator, the pilot pressure (p_V) increases as the current supply to the electro-hydraulic actuator increases, the pilot pressure is controlled such that as the pilot pressure increases, the valve slide is progressively displaced in opposition to the reducing pressure and the first actuating pressure decreases until the second actuating pressure is at least substantially the same as the first actuating pressure.

2. The hydraulic system according to claim 1, wherein the reducing pressure (p_red) that acts in opposition to the pilot pressure (p_V) is applied in an area of a further functional surface (16) of the valve slide (9).

3. A hydraulic system (1) for actuating an interlocking shifting element (2) of a transmission, the hydraulic system comprising:

a hydraulic actuator having first and second piston chambers (3, 4) and at least one double-action piston element (5) that is connected to the shifting element and delimits the first and the second piston chambers (3, 4), the second piston chamber (4) is acted upon by a first actuating pressure (p_aus) acting in an opening direction of the shifting element (2) and the first piston chamber (3) is acted upon by a second actuating pressure (p_ein) acting in a closing direction of the shifting element (2) such that either the first or the second actuating pressure (p_ein or p_aus) is deliverable by a valve device (6) to a respective one of either the first and the second piston chambers (3 or 4), and the hydraulic system having only one electro-hydraulic actuator (7) and the electro-hydraulic actuator actuates the valve device with a pilot pressure (p_V), the valve device is actuatable to a neutral position in which the first and the second piston chambers are simultaneously acted upon by a substantially unpressurized area of the hydraulic system;

the valve device (6) and the electro-hydraulic actuator (7) being designed and functionally connected with one another in such manner that, when in an initially closed position of the interlocking shifting element, if a system pressure of the hydraulic system drops, a force component, acting in the closing direction of the shifting element (2), is applied to the piston element (5) to maintain the interlocking shifting element in the closed position;

when in the initially closed position of the interlocking shifting element, if a current supply to the electro-hydraulic actuator (7) fails, a force component acting in the opening direction of the shifting element (2), is applied to the piston element (5) such that the interlocking shifting element shifts from the closed position to an open position;

the pilot pressure (p_V) produced in an area of the electro-hydraulic actuator (7) is applied to a first functional surface (8) of a valve slide (9) of the valve device (6), and when the current is supplied to the electro-hydraulic actuator, the pilot pressure increases and the system pressure is directed to the first piston chamber to bias the piston in the closing direction;

a hydraulic pressure (p_red) that acts in opposition to the pilot pressure (p_V) is applied in an area of a further functional surface (16) of the valve slide (9); and the first functional surface is located at an axial end of the valve slide, and a surface area of the first functional surface (8) is larger than a surface area of the further functional surface (16) of the valve slide (9), the further functional surface is located at an axially opposite end of the valve slide, and the hydraulic pressure (p_red) that is applied to the further functional surface (16) correlates to a supply pressure applied to the electro-hydraulic actuator (7), upon which the pilot pressure (p_V) that is set in the area of the electro-hydraulic actuator (7) depends.

4. The hydraulic system according to claim 1, wherein the electro-hydraulic actuator (7) is a magnetic valve, in an area of which, when the magnetic valve is energized, the pilot pressure (p_V) is switched through in a direction of the valve device (6).

5. The hydraulic system according to claim 1, wherein the electro-hydraulic actuator (7) is a magnetic valve, in an area of which, when the magnetic valve is unenergized, the pilot pressure (p_V) is switched through in a direction of the substantially unpressurized area.

6. The hydraulic system according to claim 1, wherein a spring device, acting in the closing direction of the shifting element, acts upon the piston element.

7. The hydraulic system according to claim 1, wherein the substantially unpressurized area of the hydraulic system is connected to the valve device via a conduit.

8. A hydraulic system for actuating an interlocking shifting element of a transmission, the hydraulic system comprising:

a hydraulic actuator having a double-action piston element that delimits first and second piston chambers, the piston element is connected to the shifting element such that when the first piston chamber is pressurized, the shifting element is biased to an engaged position, and when the second piston chamber is pressurized, the shifting element is biased to a disengaged position;

a valve device having a slide with axially opposite end faces, a pilot pressure is applied at one end face of the slide to bias the slide toward a first axial end position, and the valve device has a spring element that applies a spring force at an opposite end face of the slide to bias the slide toward a second axial end position;

a single electro-hydraulic actuator is actuatable to adjust the pilot pressure and control movement of the slide of the valve device between the first and the second axial end positions, the electro-hydraulic actuator has a spring device which applies a spring force that displaces the electro-hydraulic actuator to a spring displaced end position, and the electro-hydraulic actuator is electrically activated by a controllable current supply to displace the electro-hydraulic actuator to an electrically displaced end position, an increase of the current supply to the electro-hydraulic actuator correlates to an increase of the pilot pressure, the increase of the pilot pressure is controlled to progressively displace the slide of the valve device in opposition to the spring force of the spring element and decrease pressure in the first piston chamber, and the increase of the pilot pressure is linearly proportional to the decrease of the pressure in the first piston chamber;

a system pressure supply directly supplies the valve device with a system pressure which is modified by the valve device to pressurize the first and the second piston chambers;

the valve device and the electro-hydraulic actuator being designed and functionally connected with one another such that, when in the engaged position of the shifting element, in which the first piston chamber is pressurized, if the system pressure of the hydraulic system drops, then the pressure in the first piston chamber is maintained to prevent disengagement of the shift element;

when in the engaged position of the shifting element, in which the first piston chamber is pressurized, if the current supply to the electro-hydraulic actuator fails, then the second piston chamber is pressurized and the shift element is biased to the disengaged condition.

9. The hydraulic system according to claim 1, wherein when in the initially closed position of the interlocking shifting element, if the system pressure of the hydraulic system drops, the electro-hydraulic actuator is electrically actuated, against a spring force, into a first position in which the pilot pressure is increased and the valve device is biased into a second position such that the second actuating pressure is delivered by the valve device to the first piston chamber and the interlocking shifting element is maintained in the closed position; and when in the initially closed position of the interlocking shifting element, if the current supply to the electro-hydraulic actuator fails, the electro-hydraulic actuator is biased by the spring force to a second position and the pilot pressure decreases to bias the valve device into the first position such that the first actuating pressure is delivered by the valve device to the second piston chamber and the interlocking shifting element is shifted to the open position.

* * * * *